(12) United States Patent
Li

(10) Patent No.: US 8,525,949 B2
(45) Date of Patent: Sep. 3, 2013

(54) BACK LIGHT MODULE AND LIQUID CRYSTAL DISPLAY DEVICE

(75) Inventor: Quan Li, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 12 days.

(21) Appl. No.: 13/375,481

(22) PCT Filed: Oct. 26, 2011

(86) PCT No.: PCT/CN2011/081352
§ 371 (c)(1),
(2), (4) Date: Nov. 30, 2011

(87) PCT Pub. No.: WO2013/053152
PCT Pub. Date: Apr. 18, 2013

(65) Prior Publication Data
US 2013/0093979 A1    Apr. 18, 2013

(51) Int. Cl.
*G02F 1/1333* (2006.01)
(52) U.S. Cl.
USPC .............................................. 349/60; 349/65
(58) Field of Classification Search
None
See application file for complete search history.

(56) References Cited

U.S. PATENT DOCUMENTS

| 6,828,721 | B2 * | 12/2004 | Wakita | 313/491 |
| 7,626,654 | B2 * | 12/2009 | Tsubokura et al. | 349/60 |
| 2002/0044437 | A1 * | 4/2002 | Lee | 362/31 |
| 2007/0172193 | A1 * | 7/2007 | Chang | 385/147 |
| 2007/0267564 | A1 | 11/2007 | Ohno et al. | |
| 2010/0188599 | A1 * | 7/2010 | Arihara | 349/60 |
| 2011/0069509 | A1 * | 3/2011 | Lin et al. | 362/607 |
| 2011/0128756 | A1 * | 6/2011 | Cho et al. | 362/606 |
| 2012/0268951 | A1 * | 10/2012 | Li | 362/353 |

FOREIGN PATENT DOCUMENTS

| CN | 1300906 | A | 6/2001 |
| CN | 1372160 | A | 10/2002 |
| CN | 2578869 | Y | 10/2003 |
| CN | 1595259 | A | 3/2005 |
| CN | 1639619 | A | 7/2005 |
| CN | 2727786 | Y | 9/2005 |
| CN | 201094116 | Y | 7/2008 |
| CN | 201130286 | Y | 10/2008 |
| CN | 101598869 | A | 12/2009 |
| CN | 102182989 | A | 9/2011 |

OTHER PUBLICATIONS

Zhong Yu, the International Searching Authority written comments, Apr. 2012, CN.
Li Yan, the first office action, Jun. 2012, CN.
Li Yan, the second office action, Mar. 2013, CN.

* cited by examiner

*Primary Examiner* — Mike Stahl
(74) *Attorney, Agent, or Firm* — IPro, Inc.; Na Xu

(57) ABSTRACT

The present invention discloses a back light module and a liquid crystal display (LCD) device. A back light module comprises a light guide plate; both sides of the light guide plate are respectively provided with multiple notches; the back light module is provided with riveted nut studs in the notches; and buffer parts are arranged between the riveted nut studs and the notches. In the present invention, because buffer material such as silicone, rubber and the like is arranged between each notch and each riveted nut stud of light guide plate, the buffer material can provide effective buffer function when the light guide plat is affected by impact force to avoid damage caused by direct impact between the light guide plate and the riveted nut studs. Thus, low cost is achieved because of simple process and economic material. In addition, the tight contact of the light guide plate and the riveted nut stud is kept by the buffer part, and the shake of the light guide plate is avoided.

7 Claims, 4 Drawing Sheets

BACK LIGHT MODULE AND LIQUID CRYSTAL DISPLAY DEVICE

TECHNICAL FIELD

The present invention relates to the field of liquid crystal displays (LCDs), and more particularly to a back light module and a LCD device.

BACKGROUND

With the appeal of energy saving, environmental protection, etc., the market share of LCD device(s) using a light emitting diode (LED) as a back light source is rapidly increased in the market year by year. At present, a common LED back light mainly comprises edge type LED back light and direct type LED back light. In the edge type LED back light, a light guide plate is used, a specific light coupling distance is set between the light guide plate and a LED light emergent surface, and the light guide plate is required to be positioned. As shown in FIG. 1, the common mode is that metal riveted nut stud(s) is used for fixing. However, if the module suffers high impact force in the transportation process or the light guide plate fiercely impacts on the metal riveted nut stud(s), because of poor impact resistance of PMMA for making the light guide plate, cracks easily occur on partial light guide plate, which have an influence on the display quality.

SUMMARY

The aim of the present invention is to provide a back light module and a LCD device thereof with low cost and high shock resistance.

The purpose of the present invention is achieved by the following technical schemes.

A back light module comprises a light guide plate; both sides of the light guide plate are respectively provided with multiple notches; the back light module is provided with riveted nut studs in the notches, and buffer parts are arranged between the riveted nut studs and the notches.

Preferably, each buffer part is a buffer sleeve, and the buffer sleeve is sheathed on the body of each riveted nut stud. The process is simple and the production and assembly are convenient as long as the buffer sleeves are sheathed on the existing riveted nut studs.

Preferably, the buffer sleeves are made of silicone, rubber or foam materials. These materials are several preferable materials used by the buffer sleeves.

Preferably, each riveted nut stud is provided with a groove; correspondingly, the buffer sleeve opening is provided with a flange which is inwards extended and is used for inserting into the groove to prevent the buffer sleeve from disconnecting by accident under the conditions of vibration, etc.

Preferably, the groove surrounds the whole surface of the riveted nut stud; correspondingly, the flange is a collar flange. The preferable fixing performance is achieved when the collar flange is matched with the groove, and assembly becomes simpler because the flange is not required to be aligned with the groove when installing the buffer sleeve.

Preferably, the thickness of each buffer sleeve is not less than 1.2 mm. Preferable shock resistance can be guaranteed only when the thickness is more than 1.2 mm.

Preferably, each buffer part is a buffer pad, and the buffer pads are arranged on the inner surfaces of the notches on both sides of the light guide plate.

Preferably, each said buffer pad is made of elastic rubber. The elastic rubber is a specific material for making the buffer pads.

Preferably, elastic rubber or foam material is filled in all the gaps between the riveted nut studs and the notches to form the buffer parts. The shock resistance becomes higher if all the gaps are filled by the buffer parts.

Preferably, said buffer parts are formed through injection molding by an adhesive dispenser.

A LCD device comprises the aforementioned back light module.

In the present invention, because buffer material such as silicone, rubber and the like is arranged between each notch and each riveted nut stud of the light guide plate, the buffer material can provide effective buffer function when the light guide plate is affected by impact force to avoid damages caused by direct impact between the light guide plate and the riveted nut studs. Thus, low cost can be achieved because of simple process and economic material. In addition, when the light guide plate is expanded with heat, the buffer material can also avoid the damage caused by direct extrusion between the light guide plate and the riveted nut studs. When the light guide plate contacts with cold, the gap between the light guide plate and each riveted nut stud is increased so that shake easily occurs. The gap between the light guide plate and each riveted nut stud is automatically filled by a buffer part through the elastic regulation of the buffer part. Thus, the tight contact between the light guide plate and the riveted nut stud is kept, and the shake of the light guide plate is avoided.

Wherein: 1. light guide plate 2. riveted nut stud; 3. backplane; 4. notch; 5. buffer part.

DETAILED DESCRIPTION

The present invention will further be described in detail in accordance with the figures and the preferred embodiments.

Figure 1:
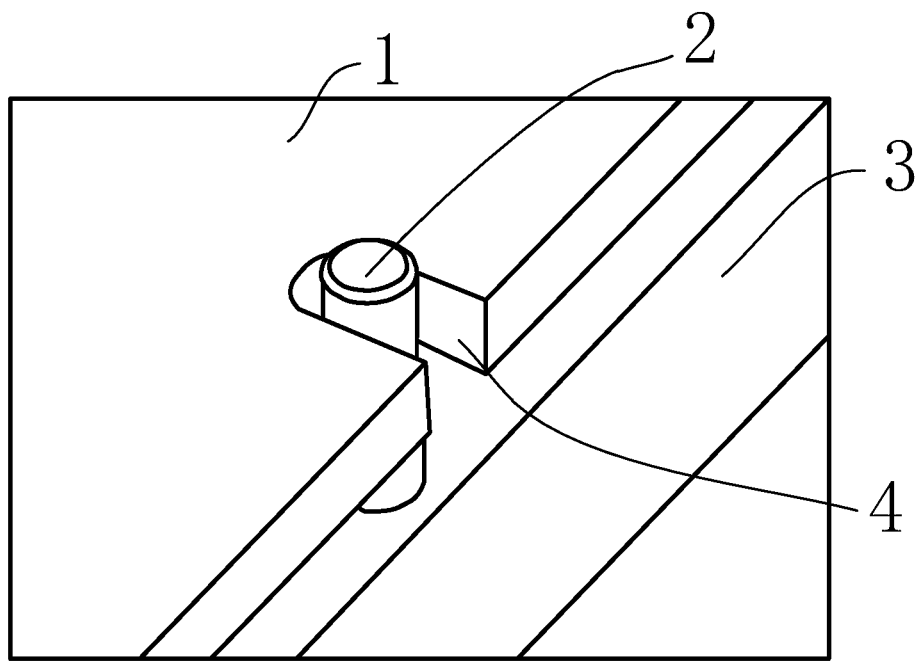
FIG. 1 is a fixing mode of a light guide plate of an existing back light module.
Figure 2:
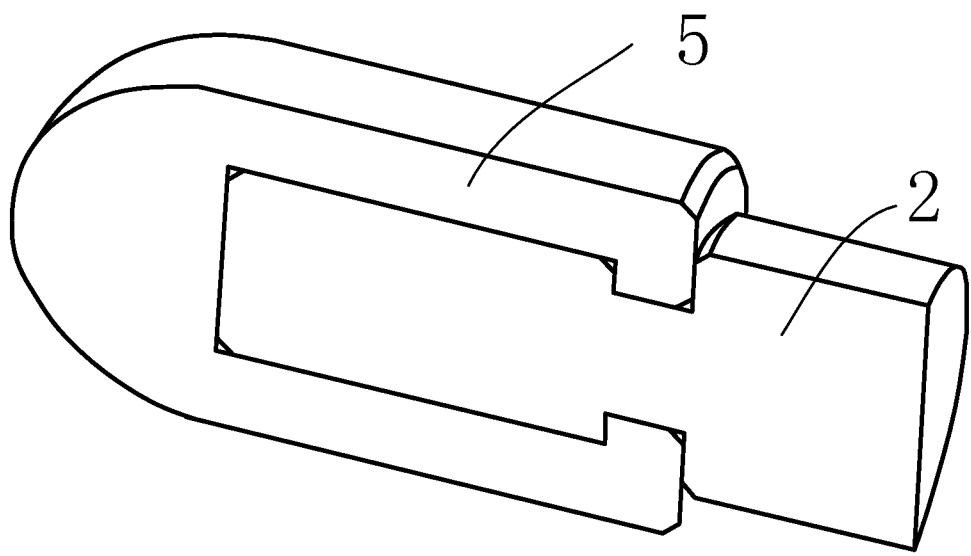
FIG. 2 is a schematic diagram of embodiment 1 of the present invention.
Figure 3:
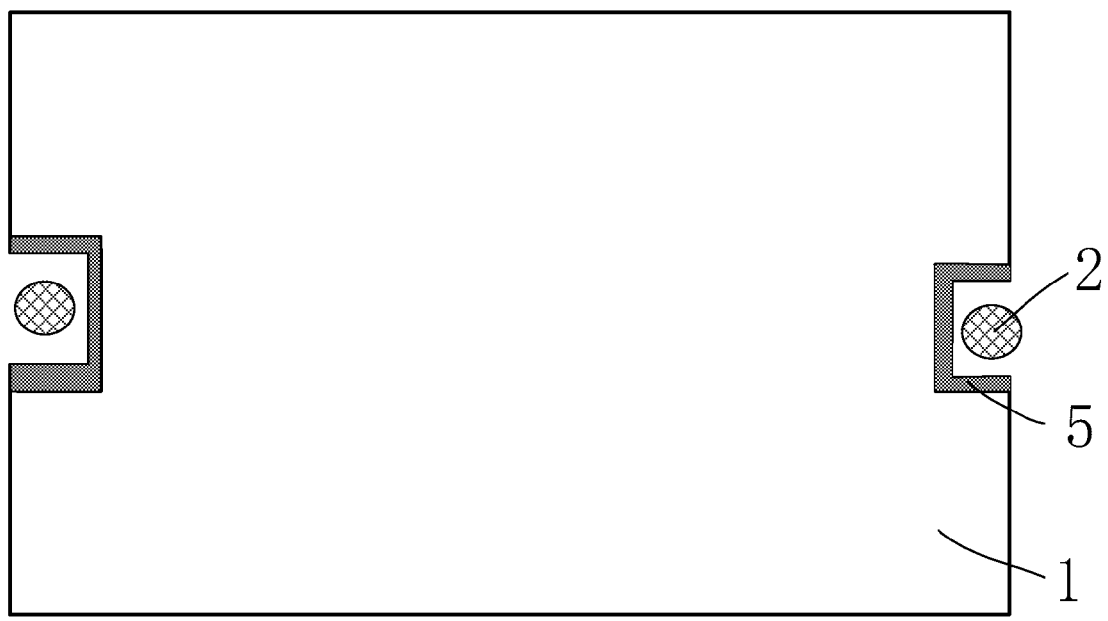
FIG. 3 is a schematic diagram of embodiment 2 of the present invention.
Figure 4:
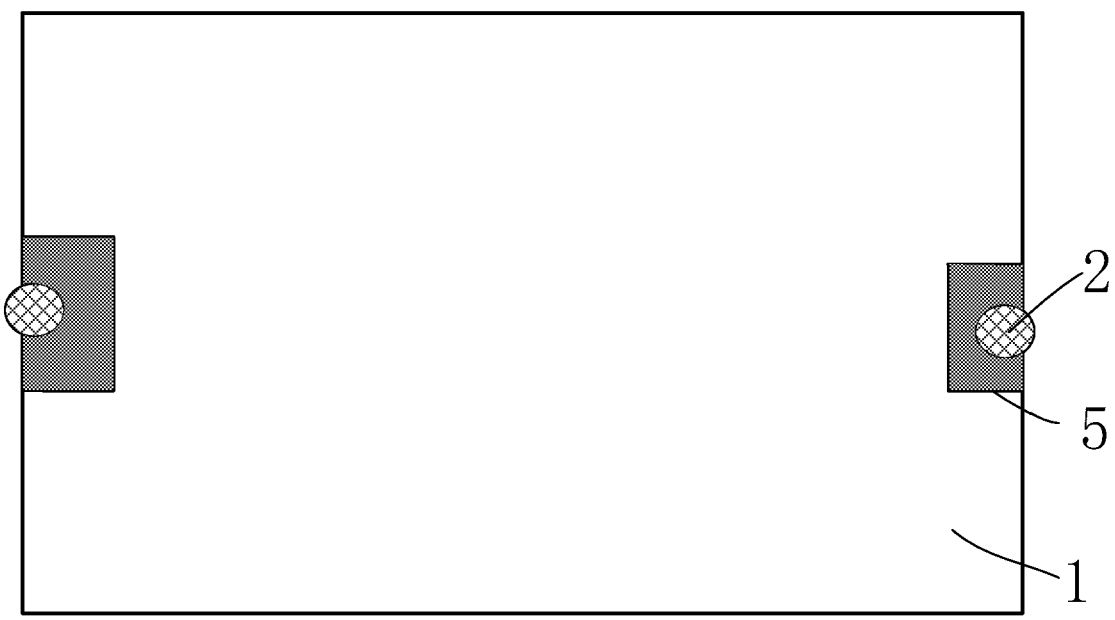
FIG. 4 is a schematic diagram of embodiment 3 of the present invention.

As shown in FIG. 2 to FIG. 4, a LCD device comprises a back light module; the back light module comprises a light guide plate 1. Both sides of said light guide plate 1 are respectively provided with multiple notches 4; the back light module is provided with riveted nut studs 2 in the notches 4; and the riveted nut studs 2 are fixed on a backplane 3. Buffer parts 5 are arranged between the riveted nut studs 2 and the notches 4. The invention will further be described in detail in accordance the embodiments.

Embodiment 1:

As shown in FIG. 2, the body of a riveted nut stud 2 is sheathed with a buffer sleeve, and the buffer sleeve is made of silicone, rubber or other foam materials. Therefore, the buffer sleeve can be a rubber sleeve. The rubber sleeve is provided with an inwards extended flange in the opening; correspondingly, the riveted nut stud 2 is provided with a groove. After the rubber sleeve is sheathed on the stud body, the flange is inserted into the groove so that the rubber sleeve is tightly fixed. To ensure the buffer effect of the rubber sleeve, the thickness of the rubber sleeve is not less than 1.2 mm.

The process is simple when the rubber sleeve is used; the rubber sleeve is sheathed on the existing riveted nut stud 2, which is convenient for production and use.

The groove surrounds the whole surface of the riveted nut stud. Correspondingly, the flange is a collar flange. The preferable fixing performance is achieved when the collar flange is matched with the groove, and assembly becomes simpler because the flange is not required to be aligned with the groove when installing the buffer sleeve.

Embodiment 2:

As shown in FIG. 3, in the embodiment, the inner surface of each notch 4 is bonded to a buffer pad by a double sided adhesive tape, and the buffer pad is made of silicone, rubber or foam material.

Embodiment 3:

As shown in FIG. 4, in the embodiment, elastic rubber is filled in the gap between the notch 4 and the riveted nut stud 2 by an adhesive dispenser. Therefore, all gaps are filled with the buffer parts 5 so that the shock resistance becomes higher.

In the present invention, because buffer material such as silicone, rubber and the like is arranged between each notch 4 and each riveted nut stud 2 of the light guide plate 1, the buffer material can provide effective buffer function when the light guide plate 1 is affected by impact force to avoid the damage caused by direct impact between the light guide plate 1 and the riveted nut studs 2. Thus, low cost is achieved because of simple process and economic material. In addition, when the light guide plate 1 is expanded with heat, the buffer material can also avoid the damage caused by direct extrusion between the light guide plate 1 and the riveted nut studs 2. When the light guide plate 1 contracts with cold, the gap between the light guide plate 1 and each riveted nut stud 2 is increased so that shake easily occurs. The gap between the light guide plate 1 and each riveted nut stud 2 is automatically filled by a buffer part 5 through the elastic regulation of the buffer part 5. Thus, the tight contact between the light guide plate 1 and the riveted nut stud 2 is kept, and the shake of the light guide plate 1 is avoided.

The present invention is described in detail in accordance with the above contents with the specific preferred embodiments. However, this invention is not limited to the specific embodiments. For the ordinary technical personnel of the technical field of the present invention, all the technical schemes that buffer material is additionally filled in all the gaps between the riveted nut studs 2 and the notches 4 of the light guide plate 1 should be considered to belong to the protection scope of the present invention.

We claim:

1. A back light module, comprising:
   a light guide plate;
   two opposite sides of said light guide plate are respectively provided with multiple notches;
   said back light module is provided with riveted nut studs in said notches, buffer parts are arranged between said riveted nut studs and said notches; and
   wherein elastic rubber or foam material is filled in all the gaps between said riveted nut studs and said notches to form said buffer parts.

2. The back light module of claim 1, wherein each said buffer part is formed through injection molding by an adhesive dispenser.

3. A liquid crystal display (LCD) device, comprising:
   a back light module, wherein said back light module comprises a light guide plate;
   two opposite sides of said light guide plate are respectively provided with multiple notches;
   said back light module is provided with riveted nut studs in said notches, buffer parts are arranged between said riveted nut studs and said notches; and
   wherein elastic rubber or foam material is filled in all the gaps between said riveted nut studs and said notches to form said buffer parts.

4. The LCD device of Claim 3, wherein each said buffer part is formed through injection molding by an adhesive dispenser.

5. A back light module, comprising:
   a light guide plate;
   two opposite sides of said light guide plate are respectively provided with multiple notches;
   said back light module is provided with riveted nut studs in said notches, buffer parts are arranged between said riveted nut studs and said notches; and
   each said buffer part is a buffer pad, and said buffer pad are bonded to interior surfaces of the notches on two opposite sides of said light guide plate; and the entire interior surface of each notch is in contact with said buffer pad respectively.

6. The back light module of claim 5, wherein said buffer pad is made of elastic rubber.

7. The back light module of claim 5, wherein each said buffer part is formed through injection molding by an adhesive dispenser.

* * * * *